United States Patent [19]
Berg

[11] Patent Number: 5,978,127
[45] Date of Patent: Nov. 2, 1999

[54] LIGHT PHASE GRATING DEVICE

[75] Inventor: John E. Berg, Boise, Id.

[73] Assignee: Zilog, Inc., Campbell, Calif.

[21] Appl. No.: 08/926,226

[22] Filed: Sep. 9, 1997

[51] Int. Cl.[6] .................................. G02B 1/01; G02B 1/11
[52] U.S. Cl. ..................... 359/279; 359/291; 359/292; 359/295; 359/846; 359/847
[58] Field of Search ................................. 359/279, 291, 359/292, 295, 846, 847

[56] References Cited

U.S. PATENT DOCUMENTS 5,654,819   8/1997   Goossen et al. .................... 359/291

*Primary Examiner*—Georgia Epps
*Assistant Examiner*—Evelyn A. Lester
*Attorney, Agent, or Firm*—Majestic, Parsons, Siebert & Hsue

[57] ABSTRACT

In a light phase grating device, by forming the beam with a bottom conductive layer, the beam will not stick to the conductive layer on the substrate. The triboelectric effect will not occur, because the bottom conductive layer of the beam will allow charges to dissipate.

16 Claims, 4 Drawing Sheets

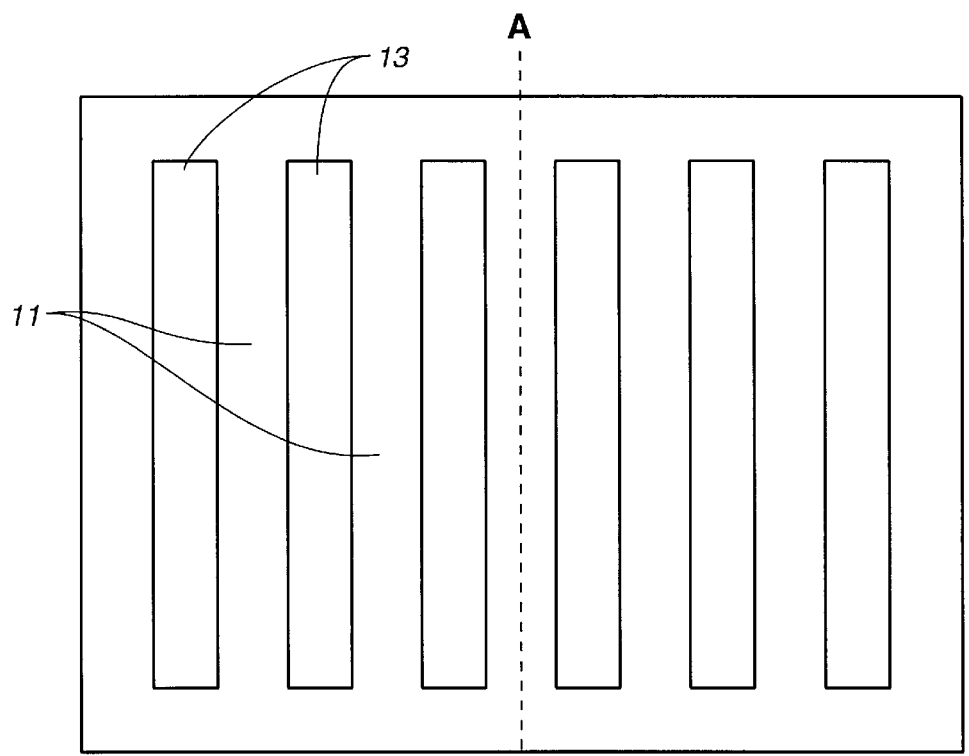
FIG._1
(PRIOR ART)
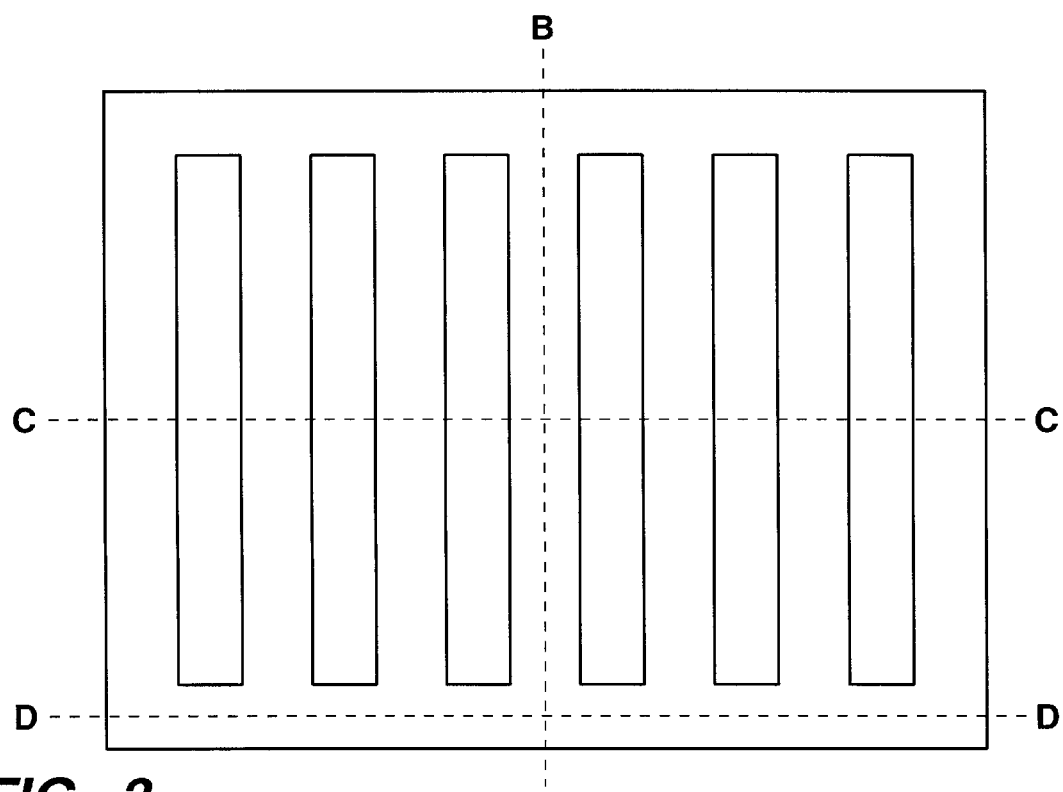
FIG._3

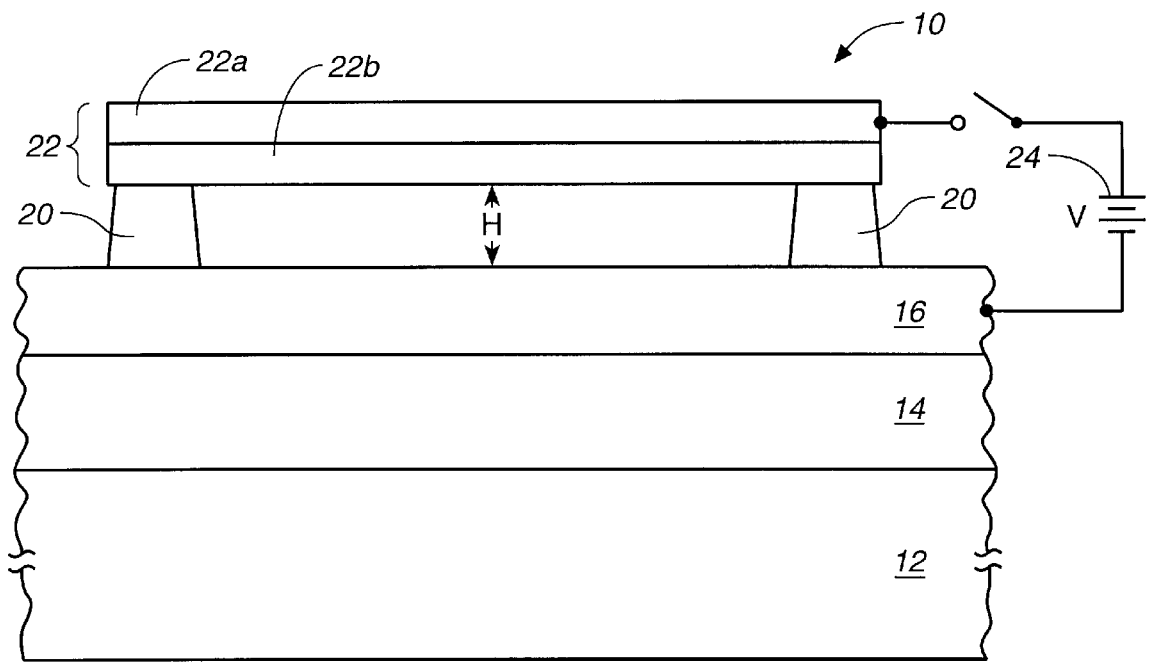
FIG._2A
(PRIOR ART)
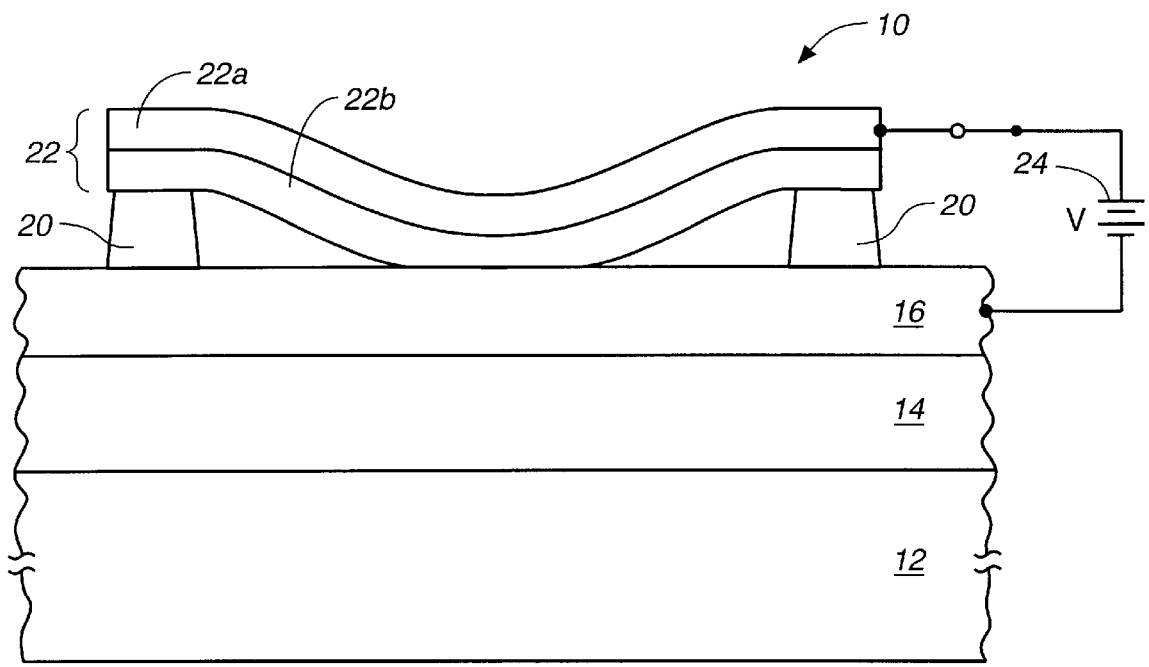
FIG._2B
(PRIOR ART)

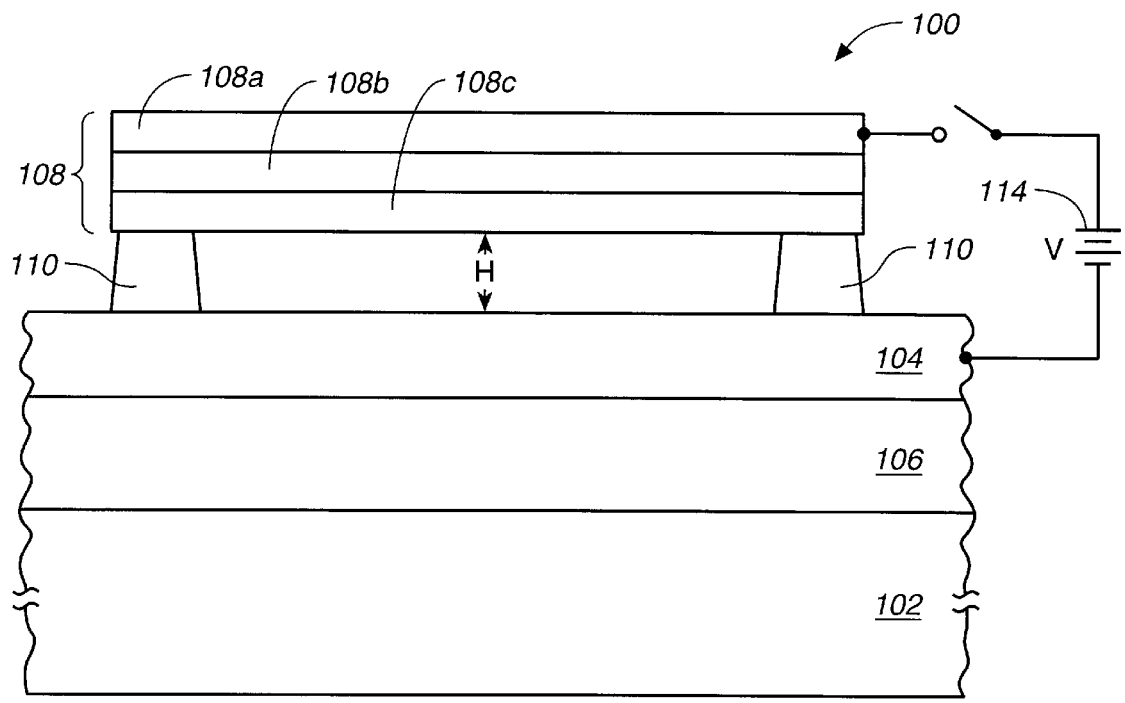
FIG._4A
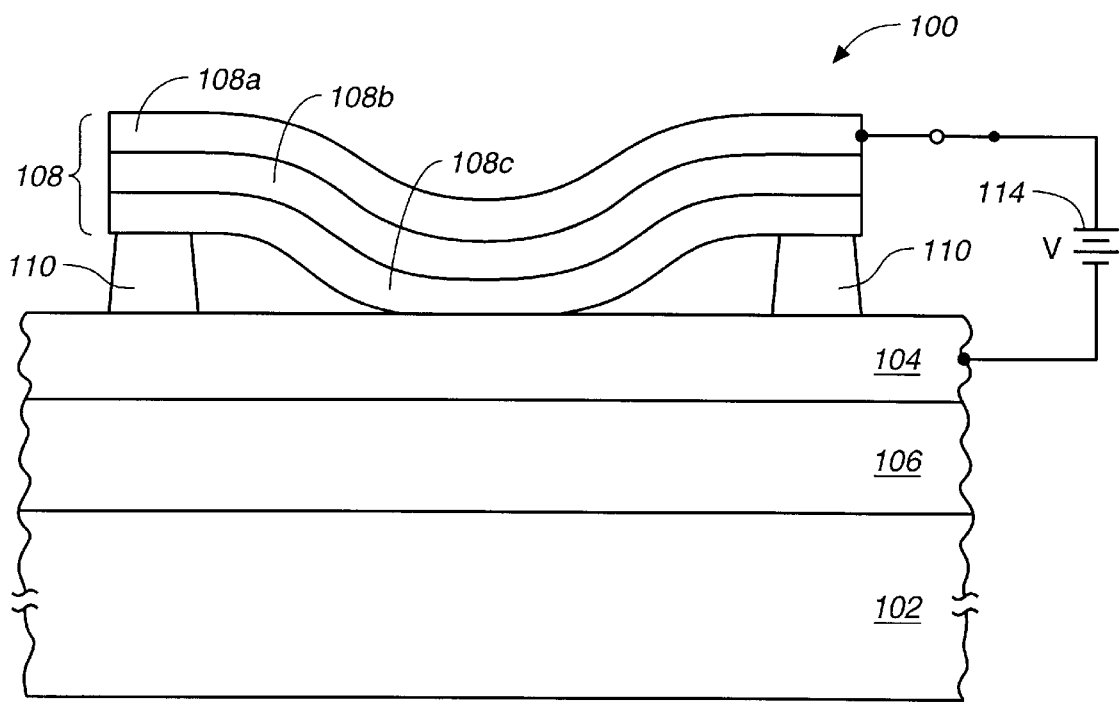
FIG._4B

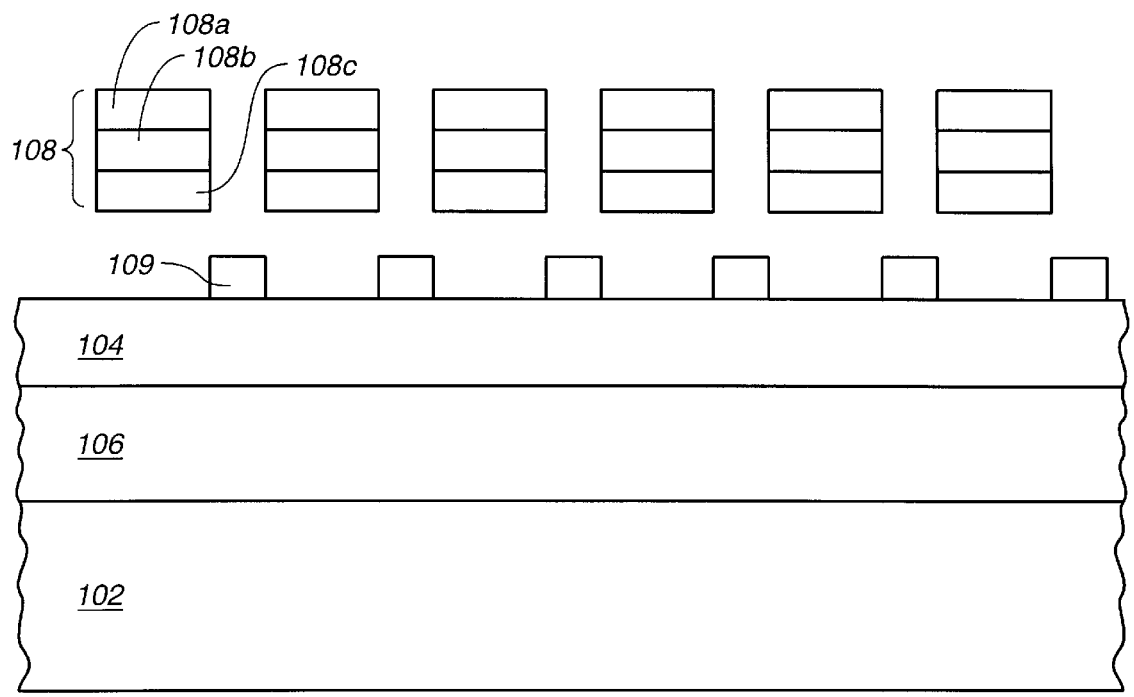
FIG._5
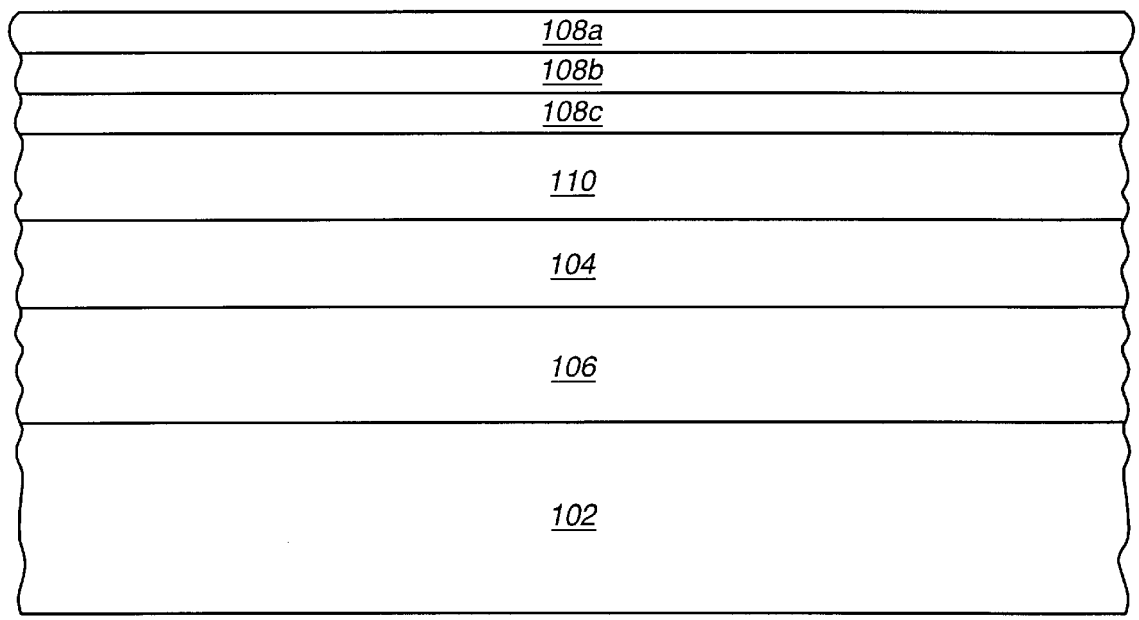
FIG._6

LIGHT PHASE GRATING DEVICE

FIELD OF THE INVENTION

This invention relates generally to light phase grating devices and, in particular, to a thin-film light phase grating device that reduces triboelectric effects in the grating device.

BACKGROUND OF THE INVENTION

Light phase grating light valves are micro-mechanical devices that are useful in display applications. These devices are generally used in combination with a light source to form selective images on a display. In particular, in response to an applied voltage, these devices either reflect or diffract light emanating from the light source. When a plurality of these devices are combined into an array separated by equally-spaced slots, in a similar manner that the pixels on a display are formed in an array, these devices can be selectively controlled to form selective images on the display.

The light phase grating light values are particularly useful for digitally controlled displays. In their general configuration, an absence of an applied voltage to these devices places them in a light reflecting mode. Conversely, when a voltage is applied to these devices, these devices are placed in a light diffracting mode. Because of the dual mode function of these devices, they easily lend themselves to be digitally controlled. That is, when the applied voltage is a "low" or a logical "zero" (0), the light phase grating device is controlled to be in its reflecting mode. Conversely, when the applied voltage is a "high" or a logical "one" (1), the light phase grating device is controlled to be in its diffracting mode. Again, when a plurality of these devices, separated by equally-spaced slots, are formed into an array, digitally controlling each of these devices can be performed to form selective images on the display.

FIG. 1 is a top diagram view of a prior art light phase grating device 10 including beam regions 11 and slot regions 13.

FIGS. 2A and 2B show the light phase grating device 10 of FIG. 1 along a cross-section A—A for its reflecting and diffracting modes, respectively. The device 10 is typically formed on an insulating layer 14 over a silicon substrate 12 and includes a first conducting layer 16 that is disposed on an insulating layer 14 that is, in turn, disposed on the substrate 12. The device 10 further includes a beam 22 that consists of a top, thin-film conducting layer 22a and a bottom, thin-film insulating layer 22b. The beam 22 is suspended over the first conducting layer 16 by a pair of insulating supports 20. Furthermore, the grating valve consists of numerous such beams, equally separated from each other by slots, as shown in FIG. 1. The film layers in each slot include the substrate 12, a dielectric region 12, a conducting region 16, and a highly reflective layer, which is typically deposited at the same time as layer 22a on the top of the beams.

In order to operate the device 10 in either its light reflecting or light diffracting modes, the device is connected to a voltage power supply, such as battery 24 shown for illustrative purposes. Specifically, one of the terminals of the battery 24 is electrically coupled to the conducting layer 22a of the beam, and the other terminal is electrically coupled to the first conducting layer 16.

When no voltage is applied to the device 10, such as shown in FIG. 2A where the positive terminal of the battery 24 is not connected to the conductive layer 22a, the beam 22 remains suspended over and not in contact with the first conducting layer 16. Since in this position the beam remains substantially horizonal, the top surface of conducting layer 22a, in conjunction with the film 22a in the slot regions, forms a substantially light reflective surface. The distance between the top of the slots and the top of the beams is such that incident light strikes the top surface of beam conducting layer and the top of the slots conducting layer will constructively interfere when there is no voltage applied to the device, which results in the beam 22 being in a suspended state.

When a voltage is applied to the device 10, such as shown in FIG. 2B where the battery 24 is connected to both the first conducting layer 16 and the top beam conducting layer 22a, the beam 22 deflects in a downward direction until the insulating layer 22b comes in contact with the first conducting layer 16. In this position, the beam conducting layer 22a is pulled to the top surface of conducting film 16. The distance between the top of the slots and the top of the beams is such that incident light that strikes both the top surface of the beam conducting layer and the top surface of the slots' conducting layer destructively interferes when the beam contacts the conducting film 16.

The problem with the prior art light phase grating device 10 is that it is unreliable. Specifically, the problem with the device 10 lies in that often the beam 22 sticks to the first conducting layer 16 and does not return to its suspended state after the applied voltage is removed. This causes the device 10 to be in its diffracting mode when it should be in its reflecting mode. Sometimes this problem is intermittent, in other words, sometimes the beam 22 sticks to the first conducting layer 16 and other times it does not. At other times, it can be catastrophic: the beam 22 always sticks to the first conducting layer 16. This results in the inability to properly control the device 10, thereby resulting in an inability to properly control the images on a display as the image changes.

The sticking problem of the prior art device 10 is due to triboelectric effects. Triboelectric effects occur when an insulating surface that is in contact with a second surface is pulled away from that second surface. When this occurs, the insulating layer becomes charged. This occurs when the second surface is conducting or insulating. In the light phase grating device 10, the beam insulating layer 22b builds up charges and charge states when it is pulled off of the first conducting layer 16. When the beam insulating layer 22b is frequently pulled off of the first conducting layer 16 during the operation of the device, a large amount of charges and charge states accumulate on the beam insulating layer that are mirrored with a mirror image charge on the first conducting layer 16. This results in a sufficient electric field between the insulating layer 22b and the conducting layer 16 that causes both layers to be so attracted to each other that they stick together, even when the applied voltage is removed. This results in a failure of the grating operation of the device 10.

A prior art attempt to solve this triboelectric sticking problem is to form the first insulating layer 16 in a manner that it has a rough top surface. This reduces the effective contact area between the beam insulating layer 22b and the first conducting layer 16. As a result, fewer charges are formed on the insulating layer as the layer is pulled off of the first conducting layer 16. This solution, however, reduces the problem, but it does not eliminate it. In other words, the light phase grating device 10 will have a longer operational and more reliable life span than if the top surface of first conducting layer 16 was not rough.

Therefore, there is a need for a light phase grating device that eliminates the problem of the beam sticking to the first conducting layer 16 due to triboelectric effects.

OBJECT OF THE INVENTION

Therefore, it is an object of the invention to provide a light phase grating device that is more reliable.

It is another object of the invention to provide a light phase grating device that solves the problem of the beam sticking to the bottom conducting plate during the operation of the device.

It is yet another object of the invention to provide a light phase grating device that eliminates the adverse consequences of triboelectric effects.

SUMMARY OF THE INVENTION

These and additional objects are accomplished by the various aspects of the present invention, wherein, briefly and generally, a light phase grating device is provided for either reflecting or diffracting an incident light in response to an applied voltage. The light phase grating device is of a type formed on a substrate and an insulating layer. It comprises a first conductive layer disposed over said substrate; and a beam having at least a portion thereof comprising top and bottom conductive layers being electrically insulated from each other by an interposing insulating layer, wherein the bottom conductive layer is of the same material type as the first conductive layer.

The light phase grating device further comprises a support structure for supporting at least said portion of the beam in a suspended state over the first conductive layer, and in a manner that when a voltage is applied across the top and first conductive layers, at least said portion of the beam moves to a deflected state whereat the bottom conductive layer is in contact with said first conductive layer and whereat the top conductive layer is capable of substantially diffracting an incident light, and in a further manner that when the applied voltage is removed, at least said portion of said beam moves back to said suspended state whereat said bottom conductive layer is not in contact with said first conductive layer and whereat said top layer is capable of substantially reflecting an incident light.

Additional objects, features and advantages of various aspects of the present invention will become apparent from the following description of its preferred embodiments, which description should be taken in conjunction with the accompanying drawings.

BRIEF DESCRIPTION OF THE DRAWINGS

FIG. 1 is a top diagrammatic view of a prior art light phase grating device.

FIGS. 2A and 2B show cross-sectional views of the light phase grating device of FIG. 1 along line A—A for a light reflecting and diffracting mode, respectively;

FIG. 3 is a top diagrammatic view of a light phase grating device of the present invention;

FIGS. 4A and 4B show cross-sectional views of the light phase grating device of FIG. 3 along line B—B for a light reflecting and diffracting mode, respectively;

FIG. 5 is a cross-sectional view of the light phase grating device of FIG. 3 shown along line C—C; and FIG. 6 is a cross-sectional view of the light phase grating device of FIG. 3 shown along line D—D.

DETAILED DESCRIPTION OF THE PREFERRED EMBODIMENTS

FIG. 3 is a top view of the light phase grating device 100 showing beam areas 101 and slot areas 103.

FIGS. 4A and 4B are cross-sectional views of the light phase grating device 100 along line A—A of FIG. 3 as for a light reflecting and diffracting mode, respectively, are shown. The device 100 is preferably formed on a substrate 102, and preferably on a silicon substrate. The light phase grating device comprises a conducting layer or plate 104 formed over the substrate 102, but preferably on an insulating layer 106 disposed on the substrate 102. The conducting plate 104 is preferably formed out of a conductive polysilicon layer or a tungsten layer. The insulating layer 106 is preferably formed out of a silicon dioxide layer.

A thin-film beam 108 is formed over the conducting plate 104 and supported by a pair of insulating supports 110 in a manner that the beam is suspended over the conducting plate 104. The beam 108 comprises three stacked layers: a top conducting layer 108a, a bottom conducting layer 108c, and an insulating layer 108b interposed or sandwiched between the top and bottom conducting layers 108a and 108c, and electrically insulating them from each other.

In the preferred embodiment, the top conducting layer 108a is comprised of either an aluminum or aluminum alloy layer, having a thickness of about 400 Angstroms. The insulating layer 108b is preferably comprised of a silicon nitride layer. The bottom conducting layer 108c is preferably of the same material type as the conducting plate 104. In the preferred embodiment, the combined thickness of the silicon nitride layer 108b and the bottom conducting layer 108c is about 1325 Angstroms. Also in the preferred embodiment, the bottom conducting layer 108c and the conductive plate 104 are both formed out of either conductive polysilicon layer or tungsten layer. Furthermore, in the preferred embodiment, the thickness or height of the silicon dioxide insulating supports 110 (denoted as "H" in FIG. 4A) is preferably about 1325 Angstroms, thereby forming a space between the bottom of the beam 108 and the conductive plate 104 of about the same height.

The gap between beam 108 and conductive plate 104 is formed by an undercutting etch that spares the silicon dioxide insulating supports 110. Slot layer 109, shown in FIG. 5, is preferably the same thickness and material as layer 108a and can be formed in the same deposition step.

During operation, when no voltage is applied to the light phase grating device 100 as shown in FIG. 4A, i.e., no voltage is applied across the top conducting layer 108a of the beam 108 and the conducting plate 104, the beam remains in a suspended state. In a preferred embodiment, the top of layer 108a is 2×1325 Angstroms above the top of slot layer 109. Coherent light reflecting from the slot travels approximately 4×1325 Angstroms more than coherent light reflected from the beam, so if the incident light has a wavelength of about 4300 Angstroms, there will be strong constructive interference. When a voltage 114 is applied across the top conducting layer 108a of the beam 108 and the conductive plate 104, the beam deflects in a manner that the bottom conducting layer 108c comes in contact with the conductive plate 104, as shown in FIG. 4B. In a preferred embodiment, the top of layer 108a is 1325 Angstroms above the top of slot layer 109. Coherent light reflected from the slot then travels approximately 2×1325 Angstroms more than coherent light reflected from the beam. Therefore, if the incident coherent light has a wavelength of about 4300 Angstroms, there will be strong destructive interference.

The advantage of the above-described light phase grating device is that it eliminates the adverse consequences of triboelectric effects. As previously discussed, triboelectric effects occur when an insulating layer is pulled off of a second surface, resulting in charges and charge states being formed on the insulating layer. In the prior art light phase grating device, the bottom layer of the beam is an insulating layer that gathers charges and charge states as it is pulled off the conductive plate during the operation of the device. Therefore, it is prone to sticking to the conductive plate.

The light phase grating device 100 of the invention, on the other hand, includes a beam 108 that has a conductive bottom layer 108c. During the operation of the device 100, it is this conductive layer 108c that comes in contact and is pulled off of the conductive plate 104. Since there is no insulating layer being pulled off of another surface, no triboelectric effects occur, i.e. no charges and charge states form on the bottom conductive layer 108c. Therefore, the beam 108 is not prone to sticking to the conductive plate 104, and as a result, the device 100 is more reliable since it does not intermittently or catastrophically fail due to triboelectric effects.

FIG. 5 is a cross-sectional view of the light phase grating of FIG. 3 along line C—C. FIG. 6 is a cross-sectional view of the light phase grating of FIG. 3 along line D—D.

It is to be understood that while the invention has been described above in conjunction with preferred specific embodiments, the description and examples are intended to illustrate and not limit the scope of the invention, which is defined by the scope of the appended claims.

It is claimed:

1. A light phase grating device for either reflecting or diffracting an incoming light in response to an applied voltage, said grating device comprising:
    a first conductive layer;
    a beam having at least a portion thereof comprising top and bottom conductive layers being electrically insulated from each other by an interposing insulating layer; and
    a support structure for supporting at least said portion of said beam in a suspended state over said first conductive layer, and in a manner that when said applied voltage is applied across said top and first conductive layers, at least said portion of said beam moves to a deflected state whereat said bottom conductive layer is in contact with said first conductive layer; and
    wherein the bottom and first conductive layers include a tungsten conductive layer.

2. A light phase grating device for either reflecting or diffracting an incoming light in response to an applied voltage, said grating device comprising:
    a first conductive layer;
    a beam having at least a portion thereof comprising top and bottom conductive layers being electrically insulated from each other by an interposing insulating layer; and
    a support structure for supporting at least said portion of said beam in a suspended state over said first conductive layer, and in a manner that when said applied voltage is applied across said top and first conductive layers, at least said portion of said beam moves to a deflected state whereat said bottom conductive layer is in contact with said first conductive layer; and
    wherein the bottom and first conductive layers include a polysilicon conductive layer.

3. A light phase grating device for either reflecting or diffracting an incoming light in response to an applied voltage, said grating device comprising:
    a first conductive layer;
    a beam having at least a portion thereof comprising top and bottom conductive layers being electrically insulated from each other by an interposing insulating layer; and
    a support structure for supporting at least said portion of said beam in a suspended state over said first conductive layer, and in a manner that when said applied voltage is applied across said top and first conductive layers, at least said portion of said beam moves to a deflected state whereat said bottom conductive layer is in contact with said first conductive layer; and
    wherein the top conductive layer includes either an aluminum or aluminum alloy conductive layer.

4. The light phase grating device of any one of claims 1, 2, or 3, wherein the insulating layer includes a silicon nitride layer.

5. A light phase grating device for either reflecting or diffracting an incoming light in response to an applied voltage, said grating device comprising:
    a first conductive layer;
    a first insulating layer interposed between said first conductive layer and a substrate
    a beam having at least a portion thereof comprising top and bottom conductive layers being electrically insulated from each other by a second interposing insulating layer; and
    a support structure for supporting at least said portion of said beam in a suspended state over said first conductive layer, and in a manner that when said applied voltage is applied across said top and first conductive layers, at least said portion of said beam moves to a deflected state whereat said bottom conductive layer is in contact with said first conductive layer.

6. The light phase grating device of any one of claims 1, 2, 3, or 5, wherein the support structure includes a layer of silicon dioxide disposed on said first conductive layer.

7. A light phase grating device for either reflecting or diffracting an incoming light in response to an applied voltage, said grating device comprising:
    a first conductive layer;
    a beam having at least a portion thereof comprising top and bottom conductive layers being electrically insulated from each other by an interposing insulating layer, wherein said top conductive layer includes an aluminum or aluminum alloy conductive layer, wherein said insulating layer includes a silicon nitride layer, and wherein said first and bottom conductive layer includes a tungsten layer; and
    a support structure for supporting at least said portion of said beam in a suspended state over said first conductive layer, and in a manner that when said applied voltage is applied across said top and first conductive layers, at least said portion of said beam moves to a deflected state whereat said bottom conductive layer is in contact with said first conductive layer.

8. A light phase grating device for either reflecting or diffracting an incoming light in response to an applied voltage, said grating device comprising:
    a first conductive layer;
    a beam having at least a portion thereof comprising top and bottom conductive layers being electrically insulated from each other by an interposing insulating layer, wherein said top conductive layer includes an aluminum or aluminum alloy conductive layer, wherein said insulating layer includes a silicon nitride layer, and wherein said first and bottom conductive layer includes a polysilicon conductive layer; and a support structure for supporting at least said portion of said beam in a suspended state over said first conductive layer, and in a manner that when said applied voltage is applied across said top and first conductive layers, at least said portion of said beam moves to a deflected state whereat said bottom conductive layer is in contact with said first conductive layer.

9. The light phase grating device of claim 7, wherein the thickness of said aluminum or aluminum alloy conductive layer is about 400 Angstroms, wherein said thickness of said the bottom conductive layer and the silicon nitride combined is about 1325 Angstroms, and wherein a space of about 1325 Angstroms is defined between said first and bottom conductive layers when said applied voltage is removed.

10. The light phase grating device of claim 9, further including a layer of silicon dioxide interposed between said first conductive layer and a substrate.

11. The light phase grating device of claim 8, wherein the thickness of said aluminum or aluminum alloy conductive layer is about 400 Angstroms, wherein said thickness of said the bottom conductive layer and the silicon nitride combined is about 1325 Angstroms, and wherein a space of about 1325 Angstroms is defined between said first and bottom conductive layers when said applied voltage is removed.

12. The light phase grating device of claim 11, further including a layer of silicon dioxide interposed between said first conductive layer and said substrate.

13. The light phase grating device of any one of claims 1, 2, 3, or 5, wherein the top conductive layer is made of the same material as the bottom conductive layer.

14. The light phase grating device of claim 5, wherein the second insulating layer includes a silicon nitride layer.

15. The light phase grating device of claim 1 or claim 2, wherein the top conductive layer includes either an aluminum or aluminum alloy conductive layer.

16. The light phase grating device of any of claims 1, 2, or 3, further including a second insulating layer interposed between said first conductive layer and a substrate.

* * * * *